United States Patent [19]

Yuen

[11] Patent Number: 5,423,033
[45] Date of Patent: Jun. 6, 1995

[54] REPORT GENERATION SYSTEM AND METHOD

[75] Inventor: Lun-Shin Yuen, Palo Alto, Calif.

[73] Assignee: Intuit, Inc., Menlo Park, Calif.

[21] Appl. No.: 954,335

[22] Filed: Sep. 30, 1992

[51] Int. Cl.⁶ .................................................. G06F 15/40
[52] U.S. Cl. ............................... 395/600; 364/DIG. 1; 395/575; 395/147; 395/275
[58] Field of Search ............... 395/600, 145, 400, 425, 395/147; 364/413

[56] References Cited

U.S. PATENT DOCUMENTS

| | | | |
|---|---|---|---|
| 4,315,309 | 2/1982 | Coli | 364/413.02 |
| 4,454,576 | 6/1984 | McInroy et al. | 395/145 |
| 4,803,614 | 2/1989 | Banba et al. | 395/275 |
| 4,805,099 | 2/1989 | Huber | 395/275 |
| 5,038,316 | 8/1991 | Hempleman et al. | 395/275 |
| 5,047,959 | 9/1991 | Phillip et al. | 395/160 |
| 5,133,067 | 7/1992 | Hara et al. | 395/600 |
| 5,168,565 | 12/1992 | Morita | 395/600 |
| 5,295,242 | 3/1994 | Mashruwala et al. | 395/159 |
| 5,317,733 | 5/1994 | Murdock | 395/600 |

*Primary Examiner*—Thomas G. Black
*Assistant Examiner*—Cuan Pham
*Attorney, Agent, or Firm*—Fenwick & West

[57] ABSTRACT

A report generation system and method generates a secondary report containing detailed information concerning a specific data element of a primary report. To generate the secondary report, the user first selects a data element on the on-screen primary report using either a mouse or a keyboard. The user then activates a command by either selecting from a menu, typing a command keystroke, or clicking the mouse. The system then generates a secondary report using new parameters determined by the particular data element selected by the user.

12 Claims, 7 Drawing Sheets

Transaction List

| Date | Num | Desc | Cat | Clr | Amount |
|---|---|---|---|---|---|
| 1/27/92 | INT | Interest Earned | Int Inc | X | 24.56 |
| 2/27/92 | INT | Interest Earned | Int Inc | X | 21.19 |
| 1/12/92 | INT | Shearson/Lehman | Int Inc | X | 81.15 |
| 2/12/92 | | Shearson/Lehman | Int Inc | X | 83.97 |
| 2/ 7/92 | | Interest Earned | Int Inc | X | 52.01 |
| 1/15/92 | | Interest Earned | Int Inc | X | 12.78 |
| 2/15/92 | | Interest Earned | Int Inc | X | 20.00 |
| 3/16/92 | | Interest Earned | Int Inc | X | 16.78 |

Esc-Cancel   Ctrl-P Print   ↑,↓ Select   F9-Go to register

*FIGURE 2*

REPORT GENERATION SYSTEM AND METHOD

BACKGROUND OF THE INVENTION

1. Field of the Invention

This invention relates to computer-implemented report generation, and, more particularly, to a system and method of generating a secondary report containing detailed information concerning a selected data element in a primary report.

2. Description of the Related Art

Many computer-implemented software packages are able to generate reports based on stored information and user-specified parameters. Typically, in such packages, the user selects a type of report from a menu or by way of keyboard commands. The system then prompts the user to provide parameters, such as the range of dates desired, account selection criteria, etc. The user typically provides these parameters using an input device such as a keyboard or a mouse. Once the user has provided the parameters, the system accesses a storage device, such as a hard disk, to obtain previously-stored information relating to the user-specified parameters. The system uses this information to generate a report, which it then displays on a video display screen. The user is then given an opportunity to view the report, print it, or generate further reports.

An example of such an on-screen report 100 for an accounting application, according to the prior art, is shown in FIG. 1. Here, the user has selected a Cash Flow report for accounts entitled Bank, Cash, and CC, for the range Jan. 1, 1992 through Mar. 31, 1992. The report parameters are indicated by title 101. Column headers 102 provide identifying information for each column of report 100. Underneath column headers 102 is a summary of all transactions for the selected range and accounts. In this particular report, transactions are summarized by transaction category, so that each row of the report contains a row header 103 identifying the transaction category, and a data element 104 giving summarized information for the transaction category. Report 100 may also provide multiple data elements 104 for each row, particularly if a plurality of date ranges are being represented. Report 100 also provides subtotals 105. Since report 100 is too large to fit on the screen, a conventional scroll bar 106 is provided to allow the user to view other parts of report 100.

Once a report has been generated and displayed on the screen, a user may wish to see more detailed information concerning a particular data element on the report. For example, in report 100 shown in FIG. 1, the user may wish to see the individual transactions that contributed to data element 107. In conventional report generating systems, the user would have to generate a new report, such as a Transaction report, specifying the single category he is interested in. In the example of FIG. 1, the user would have to request a new Transaction report for Interest Income for the range Jan. 1, 1992 to Mar. 31, 1992 for the accounts Bank, Cash, and CC. This procedure requires entry of several additional report parameters, which can become overly cumbersome, particularly when several such reports are generated in succession.

What is needed is a system that permits a user to easily generate a secondary report containing more detailed information concerning a specific data element of an on-screen primary report, without having to provide additional report parameters.

SUMMARY OF THE INVENTION

In accordance with the present invention, there is provided a system and method of generating a secondary report containing detailed information concerning a specific data element of a primary report. To generate the secondary report, the user first selects a data element on the on-screen primary report using either a mouse or a keyboard. The user then activates a command by either selecting from a menu, typing a command keystroke, or clicking the mouse.

Once the user has activated the command, the system generates a secondary report using new parameters determined by the particular data element selected by the user. Typically, the secondary report contains a number of line items, the sum of which yields the user-selected data element of the primary report. The secondary report may appear in a separate window on the screen, either overlapping or adjacent to the primary report, or it may replace the primary report on the screen. The user may be given further options, such as printing the secondary report, obtaining still more detailed information on one of the elements of the secondary report, or closing the secondary report's window to return to the primary report.

The technique of the current invention may be extended to other, non-tabular report formats, such as text-based reports and graphics-based reports. For example, in a graphics-based report, the system may generate a secondary report showing detailed information concerning a selected graphical data element, such as a wedge in a pie chart or a bar in a bar graph.

BRIEF DESCRIPTION OF THE DRAWINGS

FIG. 2 is a diagram of a secondary report, containing detailed information concerning a selected data element of the primary report.

DESCRIPTION OF THE PREFERRED EMBODIMENT

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 3:
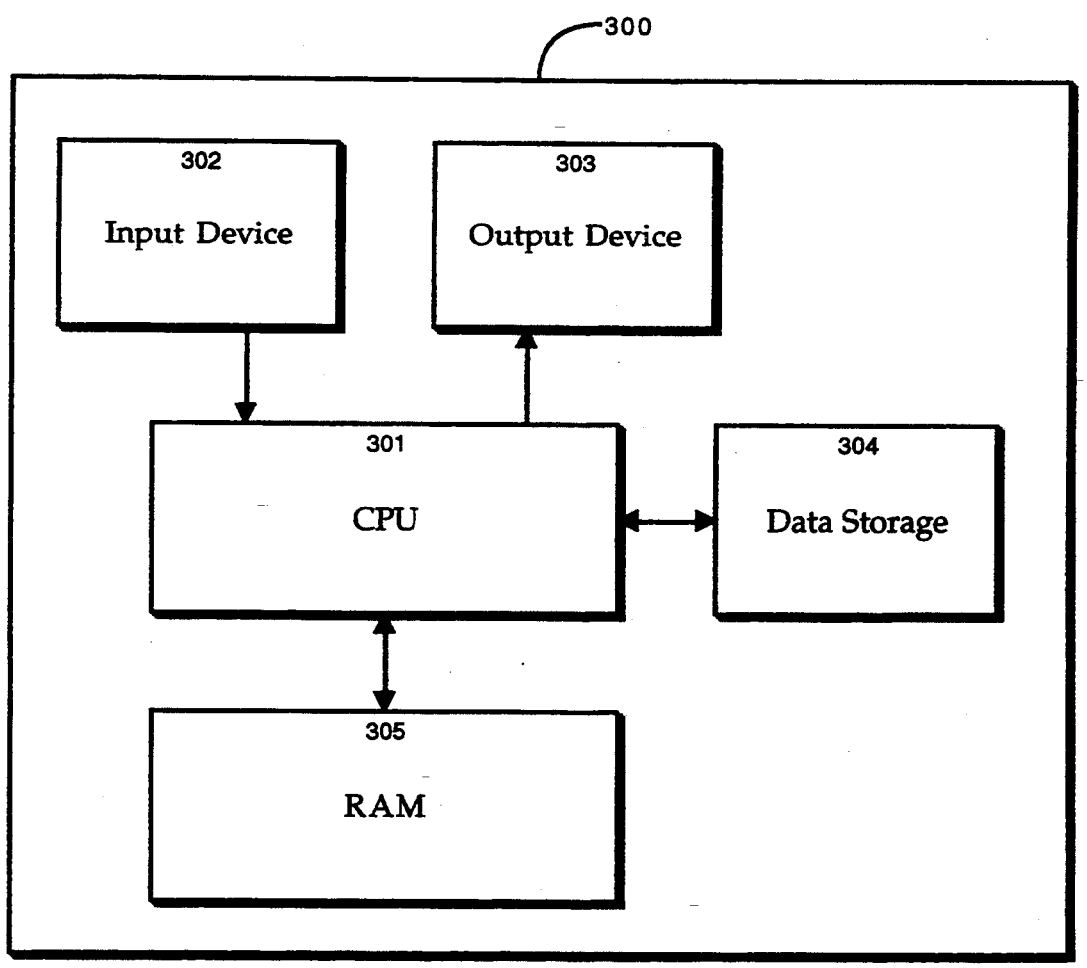
FIG. 3 is a block diagram of apparatus for practicing the present invention.

Referring now to FIG. 3, there is shown a functional block diagram of apparatus 300 for practicing the present invention. In the preferred embodiment, one or more central processing units (CPU) 301 perform the steps of the method, although any type of processor or multiple processors may be used. CPU 301 typically is a conventional personal computer that reads and executes program instructions that define the steps of the method of the invention. The program instructions are stored in data storage 304 as a software program (not shown). CPU 301 receives user input from input device 302, which may be a keyboard, mouse, electronic pen, or other device. CPU 301 provides output to output device 303, which typically is a video display screen. Data used to generate reports is stored in data storage 304, which is typically a hard disk or other mass storage device. CPU 301 uses random access memory (RAM) 305 to temporarily store program instructions as well as data while generating primary and secondary reports.

In the following description of the preferred embodiment, the system is described in terms of report generation for a financial accounting software package with stored information regarding past transactions. However, the system and method of the present invention may be extended to any other type of computer-implemented report generation system.

Figure 4:
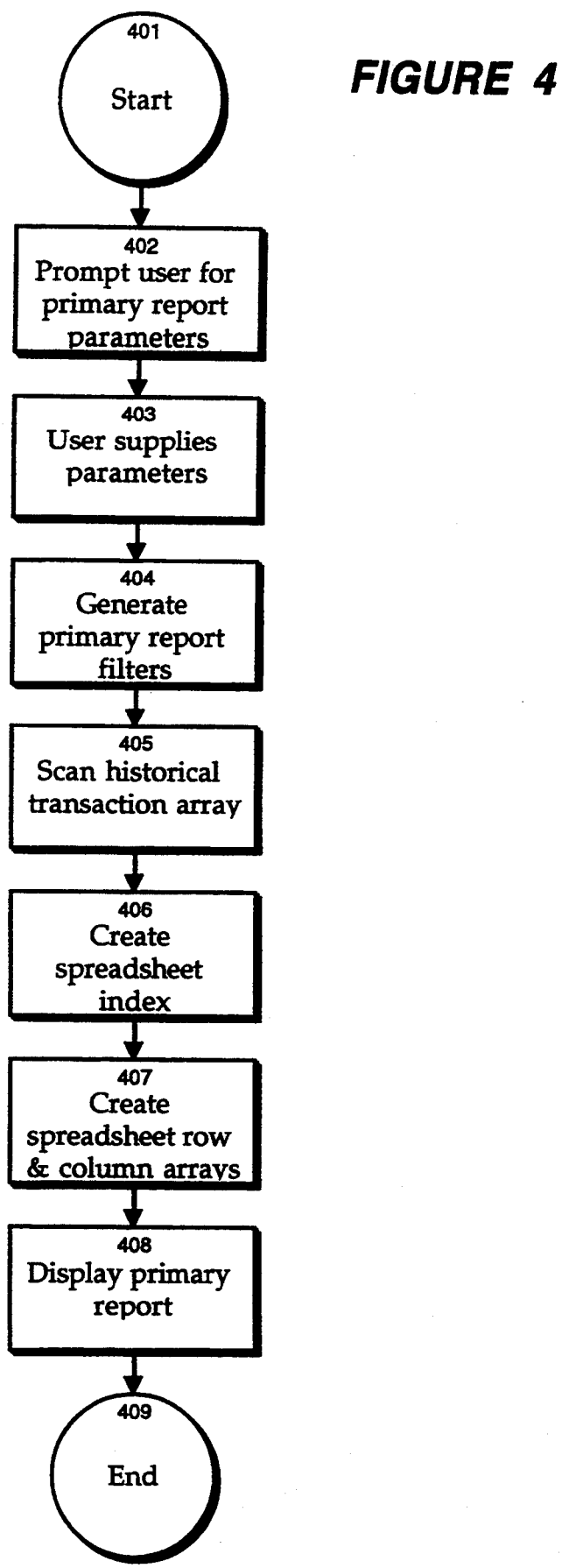
FIG. 4 is a flowchart showing a method of generating and displaying the primary report.
Figure 7:
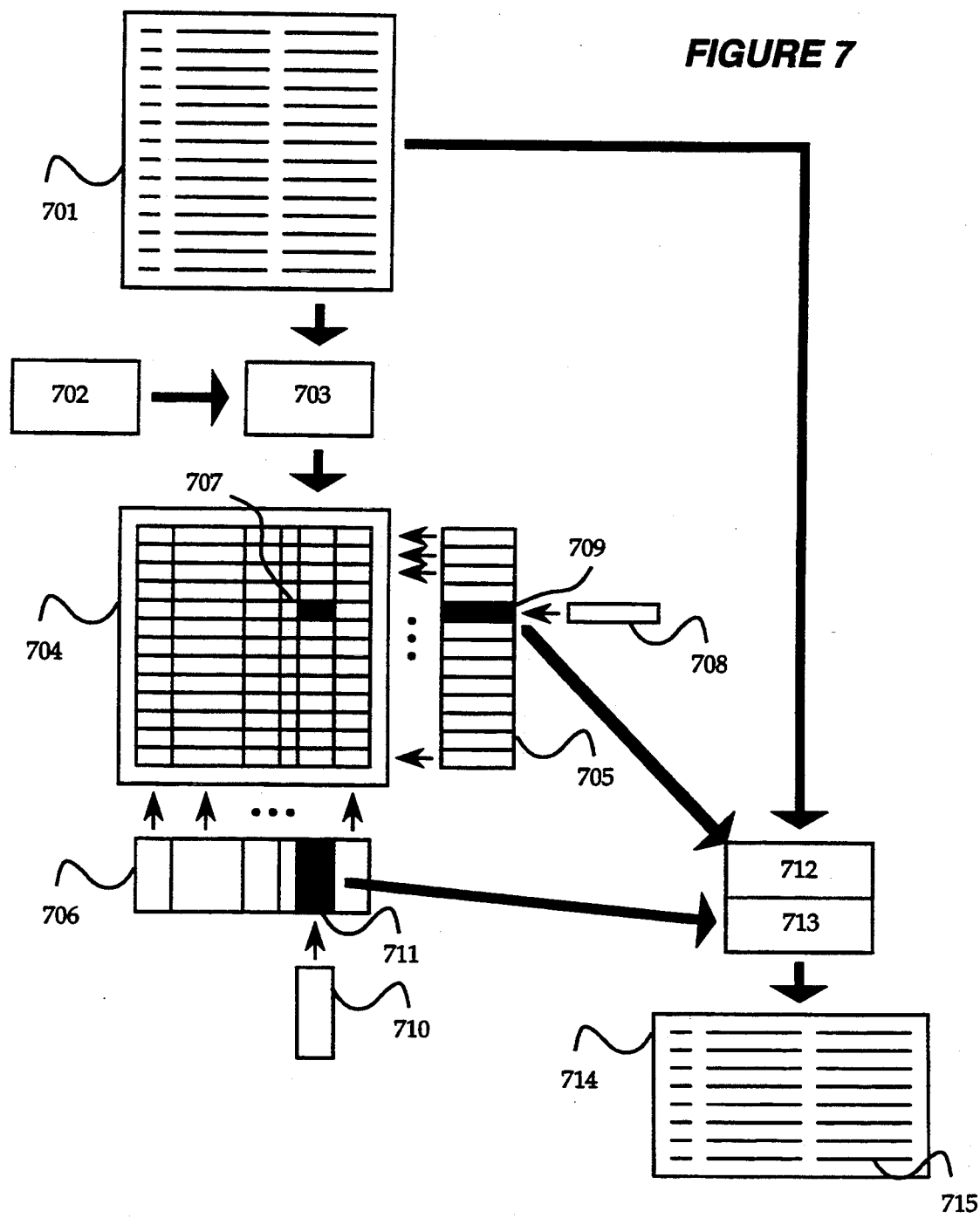
FIG. 7 is a block diagram showing the data structures used in generating reports.

Referring now to FIG. 4, there is shown a flowchart of a method of generating a primary report. Referring now also to FIG. 7, there is shown a block diagram of the data structures used in generating reports. The system prompts the user 402 for report parameters 702 that will be used in generating the primary report. The user then supplies 403 these parameters 702. Report parameters 702 typically include various constraints on the type of data to be included in the report. For example, the user may specify a particular range of dates, account types, transaction categories, and payees. Other types of constraints may also be specified, such as a series of match characters forming a text string, to further limit the items to be included in the report.

From the user-supplied parameters 702, the system generates 404 primary report filters 703. The system then scans 405 historical transaction array 701 that contains a previously-stored serial listing of data describing past transactions. Data fields within historical transaction array 701 typically include the transaction date, the payee, the type of action (deposit or withdrawal), the affected account, the categorization of the transaction, the amount of the transaction, and a comment field. As the system scans array 701, it applies primary report filters 703 to extract those transactions that fall within the user-specified parameters.

The system creates 406 spreadsheet index array 704 summarizing the filtered items (i.e., those that match the user-specified parameters) from historical transaction array 701. It also creates 407 a spreadsheet row array 705 that lists the delimiting criteria associated with each specific row in spreadsheet index array 704, and a spreadsheet column array 706 that lists the delimiting criteria associated with each specific column in spreadsheet index array 704.

Figure 1:
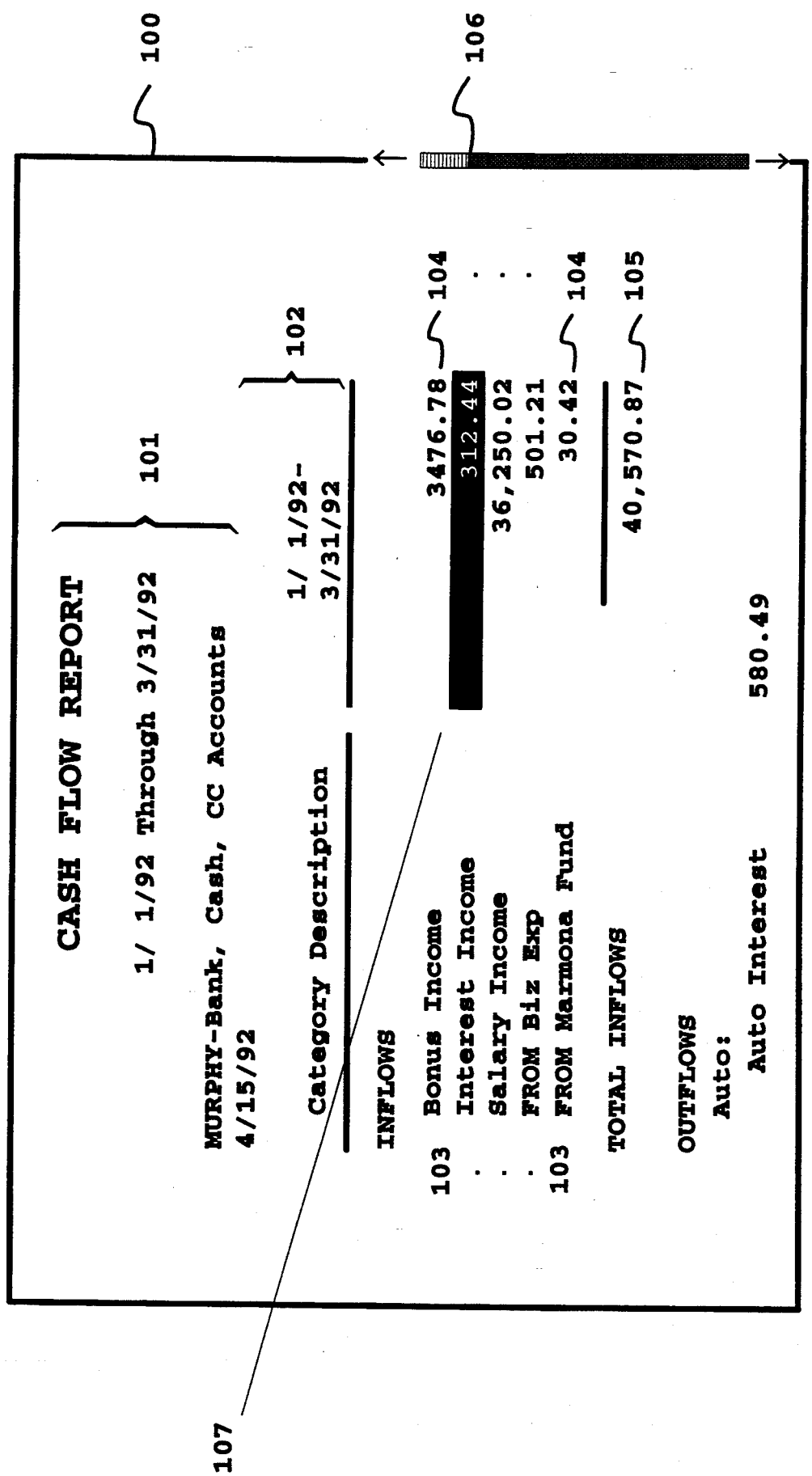
FIG. 1 is a diagram of a primary report, according to the prior art.

The system then displays 408 the primary report comprising data from spreadsheet index array 704 using output device 303, typically a video display screen. FIG. 1 shows an example of a displayed primary report 100, including a title 101 indicating the type of report and user-specified parameters, column headings 102, row headings 103, data elements 104, subtotals 105, and a scroll bar 106 if necessary to permit access to other parts of the report.

Figure 5:
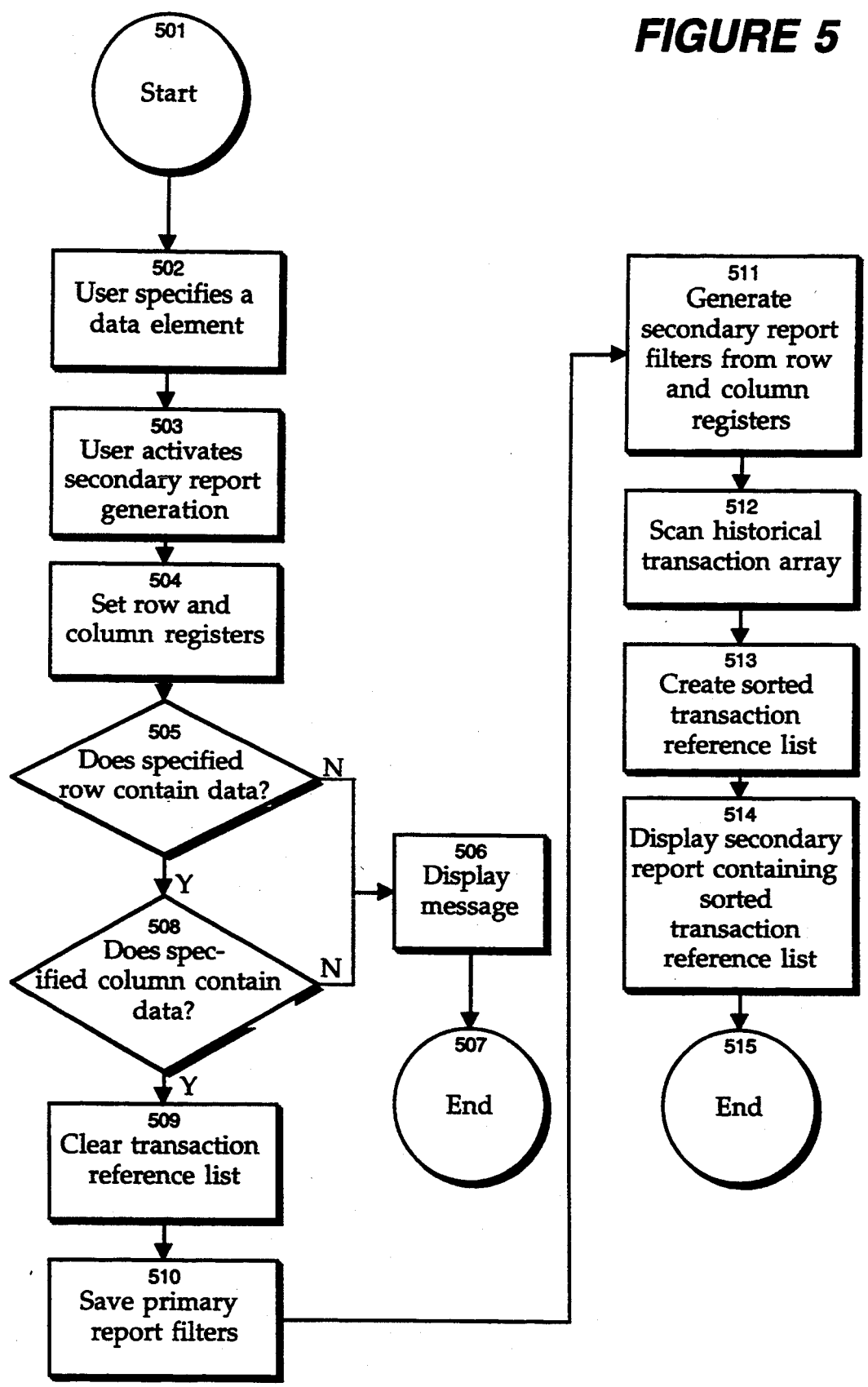
FIG. 5 is a flowchart showing a method of generating and displaying the secondary report.

Referring now also to FIG. 5, there is shown a flowchart of a method of generating a secondary report. Once the system has displayed the primary report on the screen, the user is given an opportunity to select a particular data element in the report. Typically, the user specifies 502 a particular data element 707 by moving an on-screen cursor using a mouse or keyboard cursor control. In FIG. 1, the position of the on-screen cursor is shown by the use of inverse video at the location of selected data element 107.

Once the user has specified 502 data element 707, he or she activates 503 secondary report generation, either by clicking the mouse, selecting from a menu, or typing a command. The system sets 504 row pointer register 708 and column pointer register 710 to match the row and column location of specified data element 707. Each of these pointer registers 708 and 710 point to an entry in previously-created spreadsheet pointer arrays 705 and 706: row pointer register 708 points to entry 709 in spreadsheet row array 705, and column pointer register 710 points to entry 711 in spreadsheet column array 706.

The system checks 505 to see if the specified row contains data describing either transaction amounts or total amounts. It performs this check by examining the delimiting criteria associated with specified row 709 in spreadsheet row array 705. If the specified row does not contain data (for example, it may contain a subheading or a blank line), the system displays 506 a message informing the user that it is unable to generate a secondary report based on selected data element 707, and stops 507.

If the specified row does contain data, the system checks 506 to see if the specified column contains data describing either transaction amounts or total amounts. It performs this check by examining the delimiting criteria associated with specified column 711 in spreadsheet column array 706. If the specified column does not contain data (for example, it may contain category descriptions or a blank column), the system displays 506 a message informing the user that it is unable to generate a secondary report based on selected data element 707, and stops 507.

If the specified column does contain data, the system clears 509 transaction reference list 714, which is a sorted list used to store selected items from historical transaction array 701. Data fields within transaction reference list 714 contain similar types of information to those stored in historical transaction array 701. Transaction reference list 714 differs from spreadsheet index array 704 in that spreadsheet index array 704 contains summarized data wherein each individual row typically contains data summarizing multiple transactions, while transaction reference list 714 contains data describing individual transactions.

The system saves 510 previously-generated primary report filters 703, and generates 511 secondary report filters 712 and 713. It generates secondary row report filter 712 from row register 708, and secondary column report filter 713 from column register 710. The system then scans 512 historical transaction array 701. As the system scans, it applies secondary report filters 712 and 713 to extract those transactions that pertain to selected data element 707. The system creates 513 sorted transaction reference list 714 using extracted transactions from historical transaction array 701.

The system displays 514 a secondary report showing sorted transaction reference list 714, typically in a secondary window on the display. Generally, the amounts 715 shown in the secondary report add up to a total corresponding to selected data element 707.

Referring now to FIG. 2, there is shown an example of a secondary report 200 based on selected data element 107 from primary report 100. Secondary report 200 contains column headings 201 and a list of transactions 202 showing detailed information for each transaction. Scroll bar 203 is provided in case report 200 does not fit in the on-screen window.

Secondary report 200 is created as follows. The user specifies data element 107 from primary report 100, and activates secondary report generation. Row and column registers 708 and 710 are set to point to the appropriate entries 709 and 711 in spreadsheet row and column arrays 705 and 706, respectively. In this case, entry 709 specifies a filter indicating "Interest Income" transactions, and entry 711 specifies a filter indicating the dates Jan. 1, 1992–Mar. 31, 1992. The system scans historical transaction array 701 and extracts transactions matching these parameters, namely all Interest Income transactions between Jan. 1, 1992 and Mar. 31, 1992. These transactions are placed in sorted transaction reference list 714 are displayed in secondary report 200. In this example, the amounts of the eight transactions shown add up to $312.44, which corresponds to the amount in selected data element 107 of primary report 100.

Figure 6:
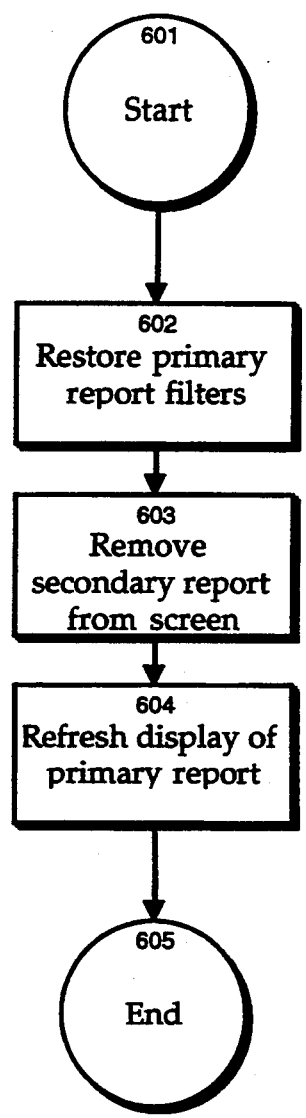
FIG. 6 is a flowchart showing a method of escaping the secondary report.

Once the secondary report is displayed on the screen, the user may request the system to "escape" the secondary report, print it out, or generate an additional report containing information concerning one data element of the secondary report. Referring now to FIG. 6, there is shown a flowchart of a method of escaping the secondary report. The system restores 602 the primary report filters as they were before the secondary report was generated. It then removes 603 the secondary report from the screen, and, if necessary, refreshes 604 the display of the primary report.

If, while viewing the secondary report, the user requests the system to print it out, the system does so according to conventional printing methods. If the user requests generation of an additional report containing information concerning a selected data element of the secondary report, the additional report is generated according to the method described above for generation of the secondary report. Multiple "levels" of additional reports may be generated in this manner.

From the above description, it will be apparent that the invention disclosed herein provides a novel and advantageous system and method of generating a secondary report containing detailed information concerning a specific data element of a primary report. The foregoing discussion discloses and describes merely exemplary methods and embodiments of the present invention. As will be understood by those familiar with the art, the invention may be embodied in other specific forms without departing from the spirit or essential characteristics thereof. For example, any or all of the reports may contain graphical data representations, rather than tabular ones. For graphical reports, the above-described system generates the secondary report based on a selected graphical element of the primary report, such as a wedge in a pie chart or a bar in a bar graph. Accordingly, the disclosure of the present invention is intended to be illustrative, but not limiting, of the scope of the invention, which is set forth in the following claims.

What is claimed is:

1. In a computer system including a display for displaying tabular or graphical information, and a memory for storing a database of transactions, each transaction having a plurality of attributes, each attribute having a value, a method for generating a secondary report, containing at least one transaction, directly from a primary report displayed on the display, the method comprising the steps of:

providing a primary report filter having attributes with specified values;

applying the primary report filter to the database of transactions to produce a primary report, the primary report containing at least one dynamically created data element, each such data element summarizing a subset of selected transactions from the database of transactions, but not existing as a transaction in the database;

displaying the primary report on the display;

receiving a user input selecting one of the data elements contained in the primary report;

generating a secondary report filter from the selected data element, the secondary report filter having attributes with values that correspond to the values of the attributes for the subset of transactions summarized by the selected data element;

applying the secondary report filter to the database of transactions to generate a secondary report, the secondary report containing all transactions having attributes with values specified by the secondary report filter, such that the transactions in the secondary report are the transactions in the subset of transactions summarized by the selected data element in the primary report; and displaying the secondary report on the display.

2. The method of claim 1 wherein the step of providing a primary report filter comprises the substeps of:

displaying a plurality of primary report parameters on the display;

receiving user inputs designating selected ones of the displayed primary report parameters;

receiving user inputs specifying values for each of the selected primary report parameters; and, generating a primary report filter from the selected primary report parameters, the primary report filter having attributes corresponding to the selected primary report parameters, the attributes having the specified values for the selected primary report parameters.

3. The method of claim 1, wherein the step of applying the primary report filter to the database of transactions to produce a primary report comprises the substeps of:

scanning the database of transactions;

extracting from the database all transactions having attributes with values that correspond to the values of the attributes of the primary report filter;

dynamically creating at least one data element summarizing selected ones of the extracted transactions, the data element having attributes with values that correspond to only the attribute values of the selected transactions; and compiling all the data elements into the primary report.

4. The method of claim 1 wherein the step of applying the secondary report filter to the database of transactions to generate a secondary report comprises the substeps of:

scanning the database of transactions;

extracting from the database all transactions having attributes with values that correspond to the values of the attributes of the secondary report filter; and compiling all the extracted transactions into the secondary report.

5. The method of claim 1, wherein the step of displaying the primary report further comprises generating a tabular representation of the data elements.

6. The method of claim 1, wherein the step of displaying the secondary report further comprises generating a tabular representation of the transactions.

7. The method of claim 1, wherein the step of displaying the primary report further comprises generating a graphical representation of the data elements.

8. The method of claim 1, wherein the step of displaying the secondary report further comprises generating a graphical representation of the transactions.

9. A computer system for generating a primary and a secondary report, the primary report comprising at least one dynamically created data element summarizing transactions in a database of the computer system, the secondary report generated from a selected data element in the primary report, the system comprising:

a memory unit containing a database of transactions, each transaction having a plurality of attributes, each attribute having a value;

a display, operatively coupled to the memory unit, for displaying the primary report, the secondary report, and primary report parameters;

an input device, operatively coupled to the display, and receiving inputs selecting particular ones of the primary report parameters displayed on the display, further receiving inputs specifying values for the selected primary report parameters, and further receiving an input selecting a data element in a primary report displayed on the display;

a primary report filter module, operatively coupled to input device, and receiving therefrom the specified values of the primary report parameters, and creating a primary report filter having attributes with the specified values;

primary report module, operatively coupled to the primary report filter module and receiving therefrom the primary report filter, and further coupled to the memory unit, the primary report module applying the primary report filter to the database of transactions in the memory unit to produce a primary report containing at least one dynamically created data element, each such data element summarizing a subset of selected transactions from the database of transactions, but not existing as a transaction stored in the database, the primary report module further coupled to the display and providing thereto the primary report;

a secondary report filter module, operatively coupled to the primary report module and receiving therefrom a selected data element, and generating a secondary filter having attributes with values that correspond to the values of the attributes for the subset of transactions summarized by the selected data element; and a secondary report module, operatively coupled to the secondary report filter module to receive therefrom the secondary report filter, and further coupled to the memory unit, and applying the secondary report filters to the database of transactions to create a secondary report containing all transactions having attributes specified by the secondary report filter, such that the transactions in the secondary report are the transactions in the subset of transactions summarized by the selected data element in the primary report, the secondary report module further coupled to the display and providing thereto the secondary report.

10. The system of claim 9 wherein the primary report filter module creates a primary report filter by defining in the memory unit a data structure having attributes corresponding to the selected primary report parameters, each attribute having the specified value of the selected primary report parameter corresponding to the attribute.

11. The system of claim 9 wherein the primary report module applies the primary report filter to the database of transactions in the memory unit to produce a primary report by:

scanning the database of transactions in the memory unit;

retrieving from the memory unit all transactions having attributes with values that correspond to the values of the attributes of the primary report filter;

dynamically allocating in the memory unit at least one data element summarizing selected ones of the retrieved transactions, the data element having attributes with values that correspond to only the attribute values of the selected transactions; and associating in the memory unit all the data elements to form the primary report.

12. The system of claim 9 wherein the secondary report filter module applies the secondary report filter to the database of transactions by:

scanning the database of transactions in the memory unit;

retrieving from the memory unit all transactions having attributes with values that correspond to the values of the attributes of the secondary report filter; and associating in the memory unit all the retrieved transactions to form the secondary report.

* * * * *